US008502872B2

(12) United States Patent
Ueno

(10) Patent No.: US 8,502,872 B2
(45) Date of Patent: Aug. 6, 2013

(54) INFRARED SOLID-STATE IMAGING DEVICE

(75) Inventor: Masashi Ueno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 772 days.

(21) Appl. No.: 12/721,249

(22) Filed: Mar. 10, 2010

(65) Prior Publication Data
US 2010/0238295 A1 Sep. 23, 2010

(30) Foreign Application Priority Data

Mar. 17, 2009 (JP) ................................. 2009-064470

(51) Int. Cl.
*H04N 7/18* (2006.01)
(52) U.S. Cl.
USPC .......................................... 348/166; 348/164
(58) Field of Classification Search
USPC ................................................ 348/164–168
See application file for complete search history.

(56) References Cited

U.S. PATENT DOCUMENTS 7,718,966 B2 * 5/2010 Ueno .......................... 250/338.4
2009/0194698 A1 8/2009 Onakado et al.

FOREIGN PATENT DOCUMENTS

| JP | 2003-222555 | 8/2003 |
| JP | 2004-336099 | 11/2004 |
| JP | 2006-174041 | 6/2006 |

* cited by examiner

*Primary Examiner* — Andy Rao
(74) *Attorney, Agent, or Firm* — Oblon, Spivak, McClelland, Maier & Neustadt, L.L.P.

(57) ABSTRACT

A thermal infrared solid-state imaging device includes a pixel array having pixels diodes, a vertical power supply line connected to horizontal drive lines and commonly connecting the horizontal drive lines, integrating circuits for integrating voltages at the ends of the vertical signal lines for a predetermined integration time, and current sources connected to the vertical signal lines at an opposite end to the end of the vertical signal line which is connected to the integrating circuit. The integration time is equally divided substantially into two periods, and during one divided period of the integration time, energization is performed between one end of the vertical power supply line and the current source, and during the other divided period of the integration time, the energization is performed between other end of the vertical power supply line and the current source.

3 Claims, 9 Drawing Sheets

INFRARED SOLID-STATE IMAGING DEVICE

BACKGROUND ART

1. Technical Field

The present invention relates to a thermal infrared solid-state imaging device for detecting a temperature change generated by an incident infrared ray with two-dimensionally arrayed sensors, and more particularly to a thermal infrared solid-state imaging device that integrates electric signals from the sensors with a signal processing circuit, and then outputs the integrated signal.

2. Related Art

A circuit of an infrared solid-state imaging device making use of a temperature depending characteristic of a forward voltage of a diode driven at a constant current is disclosed, for example, in JP 2003-222555 A. FIG. 8 shows a configuration of the infrared solid-state imaging device disclosed in JP 2003-222555 A.

For a solid-state imaging device, the uniformity of characteristics among pixels is important. A diode is very small in fluctuations of forward voltage or temperature dependence among pixels, and it is particularly effective for enhancing the characteristic uniformity. A plurality of diodes 801 each having a thermally insulating structure serving as infrared detector (three in an example in FIG. 8) are connected in series for ensuring the sensitivity. The diodes 801 are arrayed two-dimensionally (4 rows×4 columns in the example in FIG. 8) to compose a pixel array. In each row, the anode of the diode 801 of each pixel is commonly connected by a horizontal drive line 802, and in each column, the cathode of the diode 801 of each pixel is commonly connected by a vertical signal line 807. By a vertical scanning circuit 806 and switches 803, 8031, . . . , the horizontal drive lines 802 of the individual rows are connected sequentially to a vertical power supply line 804. As a result, a power supply voltage is supplied to the diode 801 of the selected row from a power supply terminal 805. In JP 2003-222555 A, a constant current source 808 is connected to a terminal end of the vertical signal line 807 connected to the cathode side of the diode 801, and hence the diode 801 is driven at a constant current. The voltage across the constant current source 808 is integrated and amplified in an integrating circuit 809, and is sequentially output to an output terminal 812 by means of a horizontal scanning circuit 810 and a switch 811.

The current flowing in the horizontal drive lines 802 decreases gradually as going toward the right end of the pixel area, and thus a voltage distribution occurs among columns in the drive lines. Accordingly, in JP 2003-222555 A, a bias line 819 having the same resistance of the horizontal drive line 802 is disposed near the integrating circuit 809, and a second current source 820 for providing the same current of the current source 808 is disposed in each pixel column. Hence, simulating the voltage distribution in the horizontal drive line 802, the voltage of the bias line 819 and the voltage of the vertical signal line 807 are differentially integrated by the integrating circuit 809, so that saturation of the integrating circuit 809 by voltage drop distribution in the horizontal drive line 802 and other troubles can be prevented, and a necessary degree of amplification may be assured.

Moreover, provided is a reference signal output circuit 813 which is driven at a constant current by a current source 815, and includes a diode 814 not having a thermally insulating structure. The bias line 819 is provided with a voltage by way of low pass filters 816, 818 and a buffer 817 on the basis of the voltage of the reference signal output circuit 813. Thus, an infrared solid-state imaging device having small temperature drift is realized.

However JP 2003-222555 A does not consider the output distribution due to voltage distribution (fluctuations) caused by resistances of the vertical power supply line 804 and the vertical signal line 807. Response of a thermal infrared solid-state imaging device to an infrared ray, that is, change in voltage across a pixel is very small as compared with voltage drop components in the vertical power supply line 804 and the vertical signal line 807. Accordingly, when a voltage distribution occurs in the taken image due to resistance of the vertical power supply line 804 and the vertical signal line 807, the amplifying circuit 809 is saturated by this voltage drop distribution as well as other problem, so that a necessary amplification factor may not be assured.

Referring now to FIG. 9, the voltage distribution due to resistances of the vertical power supply line 804 and the vertical signal line 807 is discussed. FIG. 9 is a diagram of showing explicitly resistance in each pixel pitch of the horizontal drive line 802, the vertical power supply line 804, and the vertical signal line 807 in the circuit shown in FIG. 8. In FIG. 9, a second row from the bottom is energized, and the path of the flowing current is indicated by broken lines. For the sake of simplicity of explanation, the pixel array is composed of four rows by four columns, and the energized diodes of the second row from the bottom are shown in blank triangle. Also for the sake of simplicity of explanation, the integrating circuit 809 has a single input, and only one diode is included in a pixel. In FIG. 9, resistance in each pixel pitch of the vertical power supply line 804, the horizontal drive line 802, and the vertical signal line 807 are respectively denoted as Rb, Rd, and Rs. In design, the horizontal drive line 802 has the same layout between the rows, and the vertical signal line 807 is same in layout between the columns.

Values of Rd are same between the rows and values of Rs are same between the columns. The current of the current source 808 is supposed to be I. When the second row from the bottom is energized, a current 4I, which is a value obtained by multiplexing a current I by the number (four) of pixels in the horizontal direction, flows in the vertical power supply line 804, while a current I flows in the vertical signal line 807. Therefore, when the second row from the bottom is energized, a voltage drop $\Delta Vv2$ in the wiring in the vertical direction is expressed in the following equation.

$$\Delta Vv2 = Rb \cdot 4I + 2Rs \cdot I \quad (1)$$

Similarly, when a third row from the bottom is energized, a voltage drop $\Delta Vv3$ in the wiring in the vertical direction is expressed in the following equation.

$$\Delta Vv3 = 2Rb \cdot 4I + Rs \cdot I \quad (2)$$

Similarly, when fourth and first rows from the bottom are energized, voltage drops $\Delta Vv4$ and $\Delta Vv1$ in the wiring in the vertical direction are expressed in the following equations.

$$\Delta Vv4 = 3Rb \cdot 4I \quad (3)$$

$$\Delta Vv1 = 3Rs \cdot I \quad (4)$$

By applying the aforementioned relation to a pixel array of M rows×N columns, when an m-th row from the bottom is energized, a voltage drop $\Delta Vvm$ in the wiring in the vertical direction is expressed in the following equation.

$$\Delta Vvm = (m-1) \cdot Rb \cdot NI + (M-m) \cdot Rs \cdot I \quad (5)$$
$$= m \cdot (N \cdot Rb - Rs) \cdot I - m \cdot Rb \cdot N \cdot I + M \cdot Rs \cdot I$$

Therefore, regardless of the row to be energized, in order to make uniform the voltage drop ΔVvm in the wiring in the vertical direction, the condition is expressed as follows.

$$N \cdot Rb = Rs \quad (6)$$

That is, it is necessary to determine the layout of the vertical power supply line 804 and the vertical signal line 807 so as to satisfy the relation of equation (6). However, according to the diagram, the vertical power supply line 804 and the vertical signal line 807 are different in the peripheral circuit, that is, the peripheral layout, and Rb and Rs per unit length do not change always at the same rate because of the process variations, so that it is difficult to satisfy the relation of equation (6) strictly by the layout only. In particular, when the number of pixels is great, even if a slight variation occurs in Rb and Rs, the difference in the voltage drop between the vertical power supply line 804 and the vertical signal line 807 becomes large. In addition, the difference is further amplified in the integrating circuit 509, so that a larger distribution in the element output may occur.

SUMMARY OF THE INVENTION

The present invention is devised to solve the above problems, and it is hence an object thereof to present an infrared solid-state imaging device capable of reducing the voltage drop distribution in the vertical lines.

A thermal infrared solid-state imaging device according to the invention, includes a pixel array having pixels containing at least one or more series-connected diodes disposed two-dimensionally in the horizontal direction and the vertical direction, a plurality of horizontal drive lines for connecting one end of each of the diodes commonly in each row, a plurality of vertical signal lines for connecting other end of each of the diodes commonly in each column, a vertical power supply line connected to each horizontal drive line by way of a first switch, and commonly connecting the plurality of horizontal drive lines, a vertical scanning circuit for driving the switch, integrating circuits for integrating voltages at the ends of the vertical signal lines for a predetermined integration time, and current sources connected to the vertical signal lines at an opposite end to the end of the vertical signal line which is connected to the integrating circuit.

The integration time is equally divided substantially into two periods, and during one divided period of the integration time, energization is performed between one end of the vertical power supply line and the current source, and during the other divided period of the integration time, the energization is performed between other end of the vertical power supply line and the current source According to the invention, voltage drops differing in energizing paths and occurring in the vertical direction of the vertical power supply lines in each of divided periods of the integration time are summed and processed in the integrating circuit. As a result, the dependence of voltage drops on the position of the energized row is decreased. Moreover, the current source is disposed at an opposite side end of the end connected to the integrating circuit on the vertical signal lines, so that the potential effect of the vertical signal lines from the energized row to the current source is not easily fed into the integrating circuit. Hence, regardless of the number of pixels, the wiring layout, or the wiring structure, the distribution of voltage drops in the vertical lines among rows can be curtailed. Therefore, without causing saturation of the circuit, a necessary amplification factor can be assured, resulting in a thermal infrared solid-state imaging device excellent in uniformity of output.

DETAILED DESCRIPTION OF THE PREFERRED EMBODIMENTS

Embodiment 1

Figure 1:
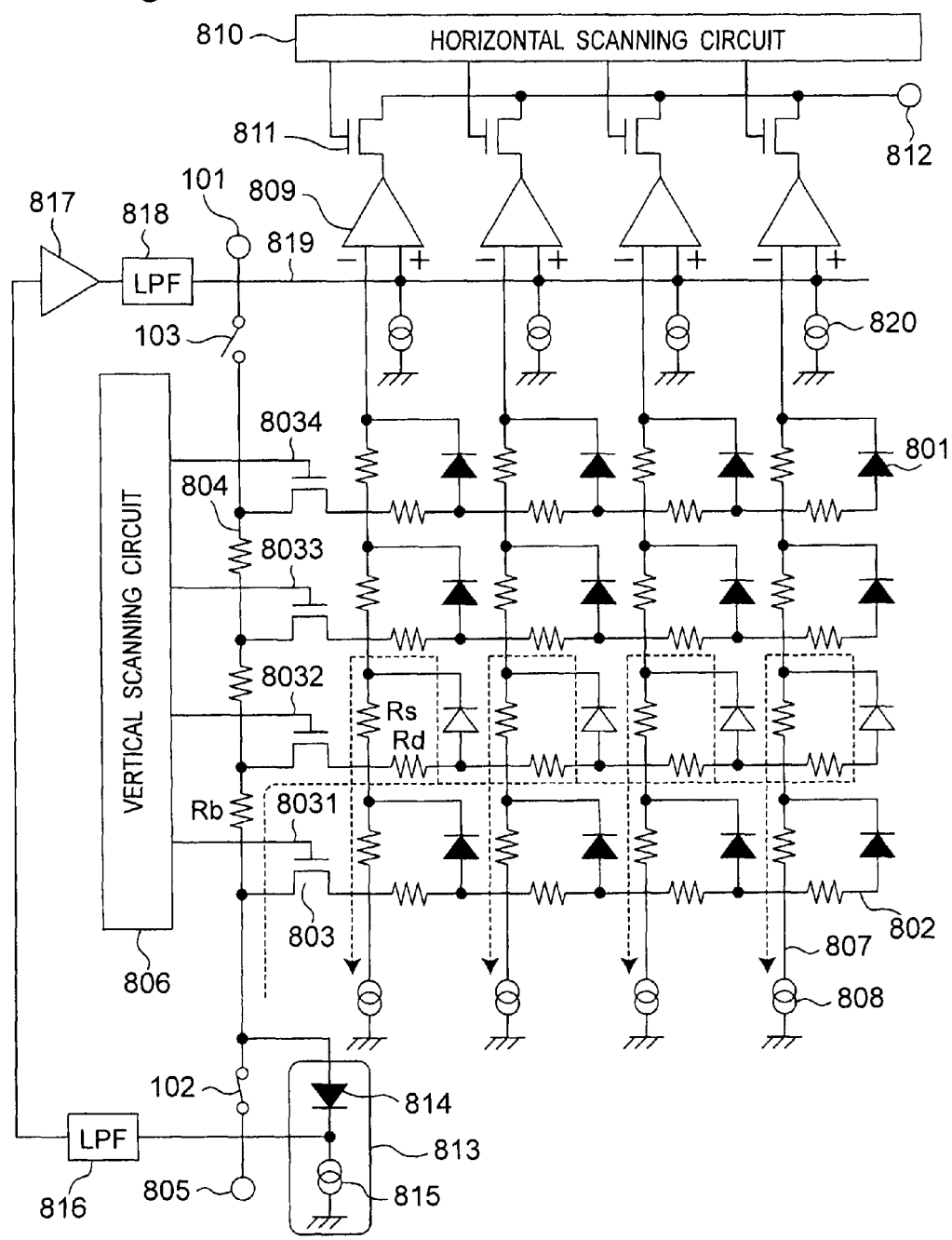
FIG. 1 is a circuit diagram showing a thermal infrared solid-state imaging device in preferred embodiment 1 of the invention.

FIG. 1 shows a thermal infrared solid-state imaging device of 4×4 pixels in preferred embodiment 1 of the invention. The thermal infrared solid-state imaging device of the preferred embodiment has a structure of the thermal infrared solid-state imaging device of patent document 1 shown in FIGS. 8 and 9, and further includes a power supply terminal 805 and a power supply terminal 101 at both ends of a vertical power supply line 804, and switches 102 and 103 for controlling supply of the current (energization) from the terminals 805 and 101. In FIG. 1, for the sake of simplicity of explanation, only one diode is shown in a pixel. Diodes on a second row from the bottom are shown in blank triangle to indicate these diodes are being energized.

Figure 2:
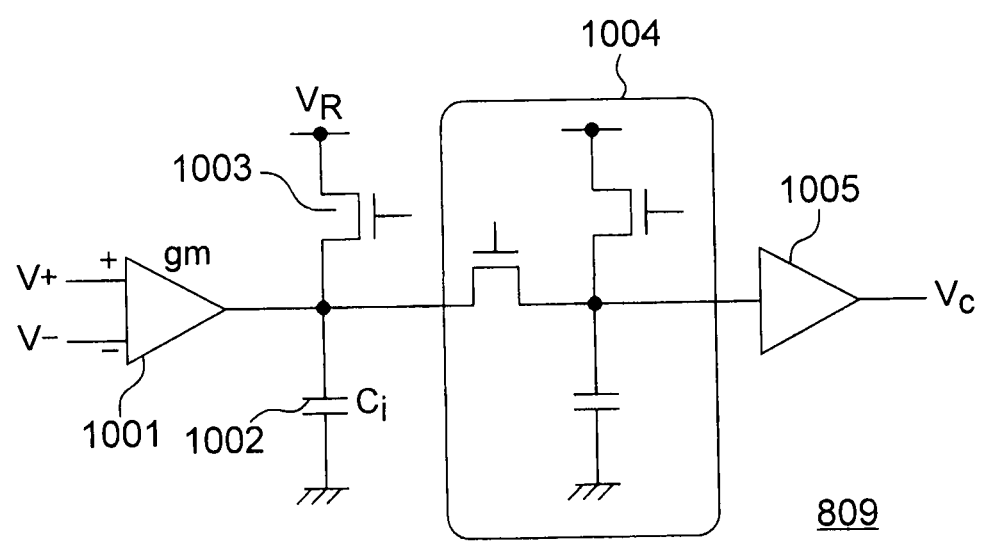
FIG. 2 is a circuit diagram showing an example of configuration of an integrating circuit.

FIG. 2 shows a structure of an integrating circuit 809. A differential voltage-current conversion amplifier 1001 outputs a current proportional to the difference between two input signal voltages $V^+$ and $V^-$. This current flows into an integral capacity 1002 which is reset to a prescribed voltage VR by a switch 1003 periodically in a horizontal blanking period (a period subtracting a row energizing period from a horizontal scanning period) during the row energizing period, and changes the potential of the integral capacity 1002. This change is sampled and held in a sample hold circuit 1004 at the end of the row energizing period, and is output by way of a buffer amplifier 1005.

Figure 3:
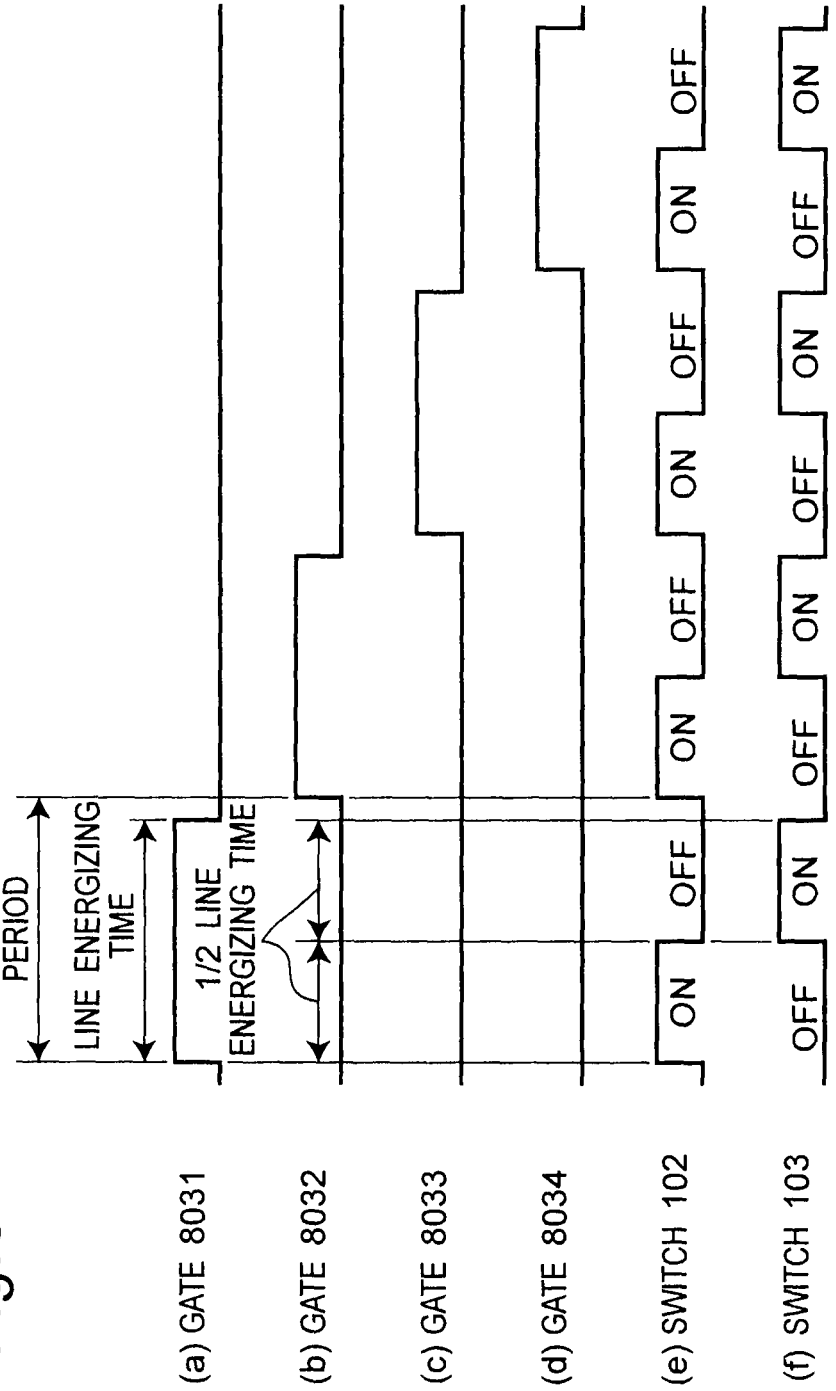
FIG. 3 is a timing chart showing the operation of the thermal infrared solid-state imaging device in preferred embodiment 1 of the invention.
Figure 4:
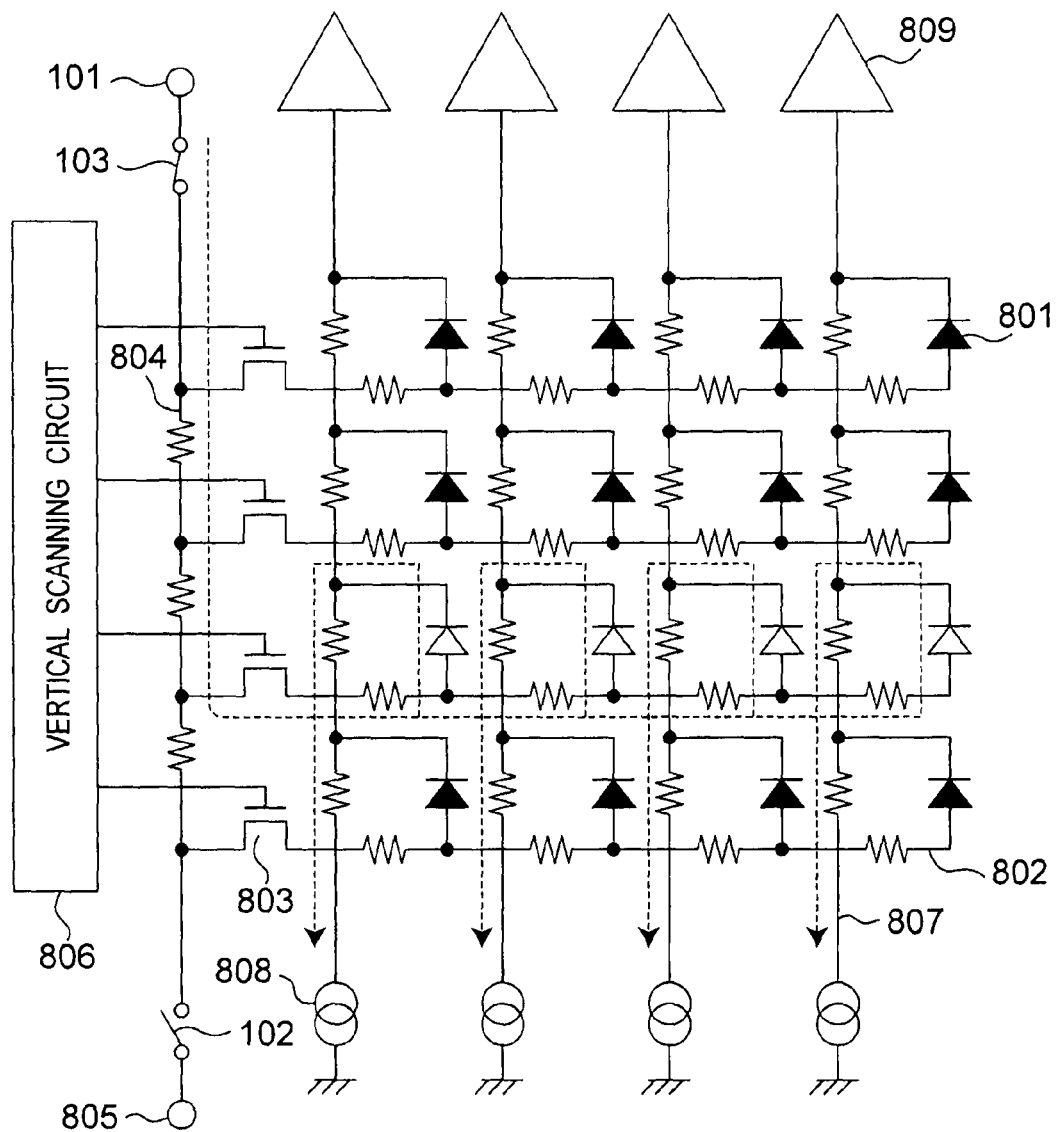
FIG. 4 is a circuit diagram showing the thermal infrared solid-state imaging device in preferred embodiment 1 of the invention.

FIG. 3 shows clocks applied to each of gates 8031 to 8034 of switch 803 and an opening-closing timing of each of switches 102 to 103. The switches 8031 to 8034 receives clocks sequentially in each horizontal scanning period. The period during which the clock is applied is a diode energizing time in each row (row energizing time). During this period, the signal is integrated and amplified in the integrating circuit 809. Therefore, the longer the row energizing time, the higher is the amplification factor of the integrating circuit 809, and noise can be decreased. Usually, a period of about 90% of the horizontal scanning period is assigned for the row energizing time. The row energizing time is set, for example, to 2 minutes. In this preferred embodiment, in particular as shown in FIGS. 3 (e) and (f), the row energizing time (the integration time) is divided into a first half and a second half. In the first-half period, the switch 102 is closed (ON) and the switch 103 is opened (OFF), while in a second-half period, the switch 103 is closed (ON) and the switch 102 is opened (OFF). In FIG. 1, when the second row from the bottom is energized, the energizing path in the first-half period of the row energizing time is indicated by broken lines. In FIG. 4, the energizing path in the second-half period of the row energizing time is indicated by broken lines. As shown in FIG. 1 and FIG. 4, the energizing path in the vertical direction is inverted in first half and the second half of the row energizing time.

As shown in FIG. 1, different from the conventional art, in the vertical signal line 807, no current flows from the cathode end of the pixel diode 801 to the integrating circuit 809, and the voltage drop in this portion is not fed into the integrating circuit 809. Supposing the current of the current source 808 to be I, when the second row from the bottom is energized, a voltage drop $\Delta Vv2F$ in the first half of the row energizing time in the lines in the vertical direction is expressed in the following equation.

$$\Delta Vv2F = Rb \cdot 4I \quad (7)$$

In the second half of the row energizing time, a voltage drop $\Delta Vv2B$ is expressed in the following equation.

$$\Delta Vv2B = 2Rb \cdot 4I \quad (8)$$

The integrating circuit 809 integrates the amount of the voltage corresponding to this voltage drop, and a voltage drop portion $\Delta Vv2T$ in the vertical lines appearing in the integral output is expressed in the following equation.

$$\Delta Vv2T = \Delta Vv2F + \Delta Vv2B = 3Rb \cdot 4I \quad (9)$$

As a more general case, a case where an m-th row from the bottom in a pixel array of M rows×N columns is energized is discussed below. In this case, in the first half of the row energizing time (the integration time), a voltage drop $\Delta VmF$ in the vertical lines is expressed in the following equation.

$$\Delta VvmF = (m-1) \cdot Rb \cdot NI \quad (10)$$

In the second half of the row energizing time (the integration time), a voltage drop $\Delta VmB$ in the vertical lines is expressed in the following equation.

$$\Delta VvmB = (M-m-1) \cdot Rb \cdot NI \quad (11)$$

In the vertical lines, a voltage drop $\Delta VvmT$ appearing in the output of the integrating circuit 809 is expressed in the following equation.

$$\Delta VvmT = \Delta VvmF + \Delta VvmB = (M-1) \cdot Rb \cdot NI \quad (12)$$

From equation (12), it is understood that the voltage drop $\Delta VvmT$ is a value not depending on the position m of the pixel row being energized. That is, if the relation of equation (6) is not satisfied, the distribution (variations) of the voltage drops between rows in the vertical lines can be curtailed to zero.

In the explanation herein, for the sake of simplicity of explanation, the integrating circuit 809 is explained as means merely having a summing function, but the integrating circuit 809 is more specifically described below in consideration of the actual function.

The integrating circuit 809 has a configuration as shown in FIG. 2. Supposing the transconductance of the voltage-current conversion amplifier 1001 to be gm, the capacitance of the integral capacity 1002 to be Ci, the reset voltage to be VR, the row energizing time to be Ti, the voltage of the non-inverting input terminal of the voltage-current conversion amplifier 1001 to be V+, and the voltage of the inverting input terminal to be V−, the voltage of the integral capacity Vc after end of the row energizing time is expressed in the following equation.

$$Vc = VR \quad gm \cdot Ti \cdot (V^+ - V^-)/Ci \quad (13)$$

Figure 8:
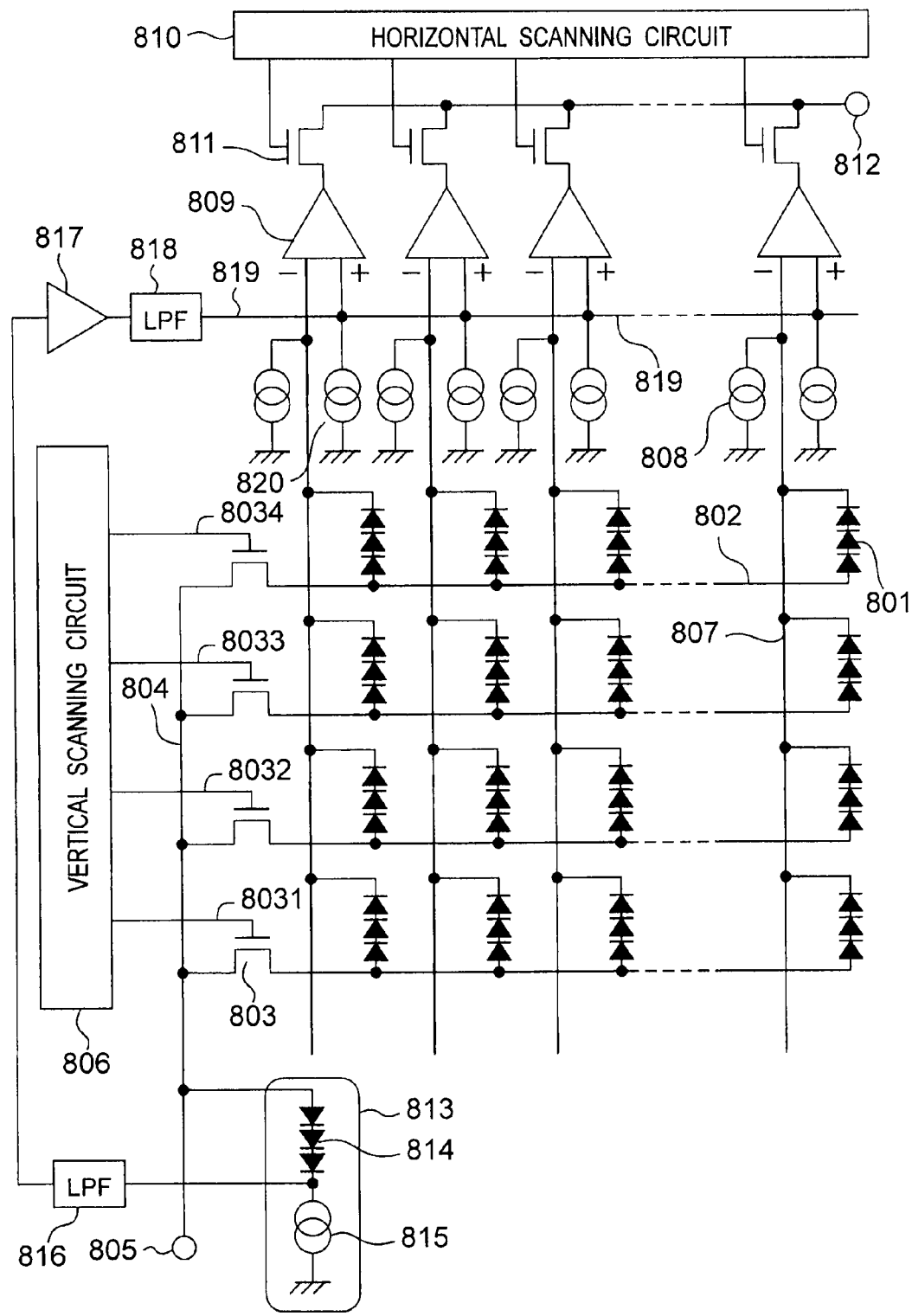
FIG. 8 is a circuit diagram showing a conventional thermal infrared solid-state imaging device.
Figure 9:
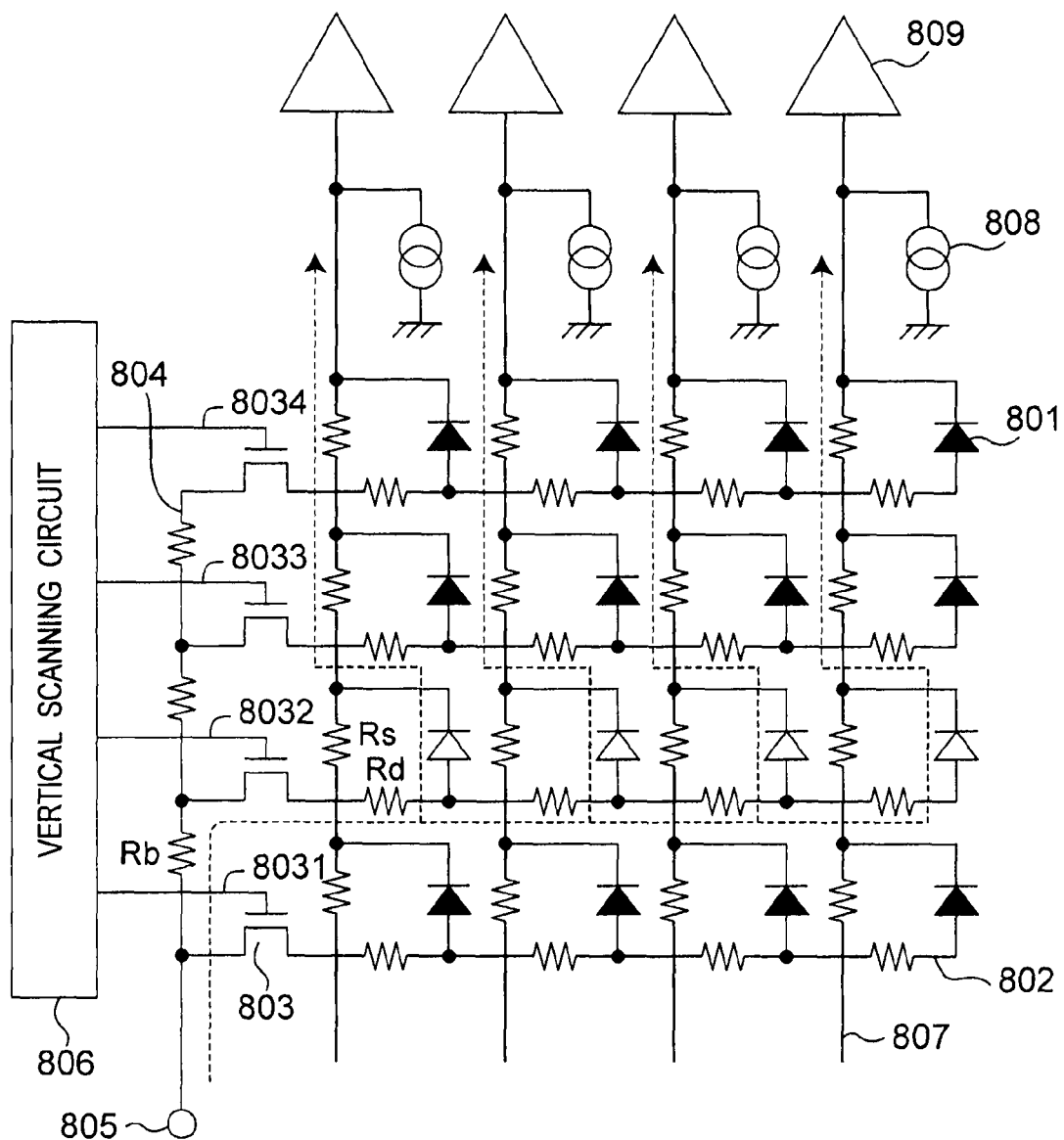
FIG. 9 is a diagram explaining a voltage drop in the vertical direction in the conventional thermal infrared solid-state imaging device.

As shown in FIG. 8, the vertical signal line 807 is connected to the inverting input terminal of the integrating circuit 809 (voltage-current conversion amplifier 1001). Supposing the supply voltage to be VDD, the voltage drop from the first column to the n-th column of the horizontal drive line 802 to be $\Delta Vhn$, and the forward voltage of the diode to be Vf, the inverting input terminal voltage V− of the voltage-current conversion amplifier 1001 is expressed in the following equation in the first half of the row energizing time (the integration time).

$$V^- = VDD - Vf - \Delta Vhn - \Delta VvmF \quad (14)$$

In the second half of the row energizing time (the integration time), it is expressed in the following equation.

$$V^- = VDD - Vf - \Delta Vhn - \Delta VvmB \quad (15)$$

Therefore, as clear from equations (13), (14), and (15), by dividing the integration time Ti in two divisions, and changing over the inverting input terminal voltage between the divided times, it is known that the voltage is summed up. As disclosed in JP 2003-222555 A, $\Delta Vhn$ is simulated by the potential of the bias line 819 and does not contribute to the integrating circuit output.

Figure 5:
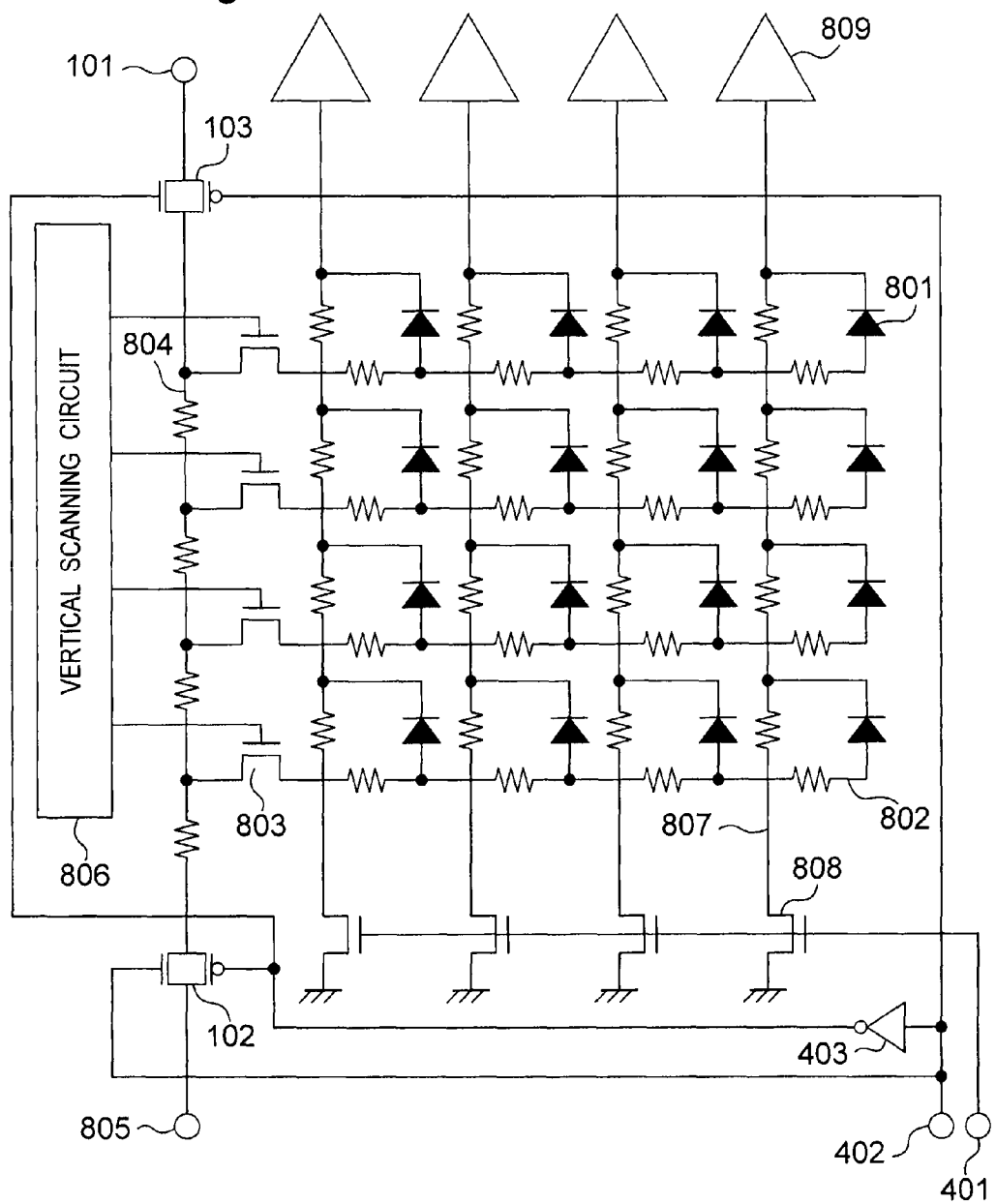
FIG. 5 is a circuit diagram showing the thermal infrared solid-state imaging device in preferred embodiment 1 of the invention.

FIG. 5 shows a specific configuration of the switches 102 and 103 and the current source 808 in the circuit configuration shown in FIG. 1. The switches 102 and 103 are composed of N-channel MOS transistors and P-channel MOS transistors connected in parallel to decrease the conduction resistance. The current source 808 is composed of N-channel MOS transistors operating in a saturated region. A specific bias voltage is applied to the gate of the transistor for composing the current source 808 from the terminal 401. This bias voltage is set lower than the drain voltage of the transistor 808, so that the transistor 808 operates in a saturated region, that is, operates at a constant current. Drive clocks shown in FIG. 3 are given to the gates of the MOS transistors 102, 103 from the terminal 402. The gates of the PMOS transistors composing the switches 102 and 103 must be provided with inverted clocks of the clocks to be applied to the gates of the N-channel MOS transistors, and hence an inverter 403 is provided. In this embodiment, the switches 102 and 103 are disposed inside the infrared solid-state imaging device, but these switches 102 and 103 may be also provided outside the device.

Embodiment 2

Figure 6:
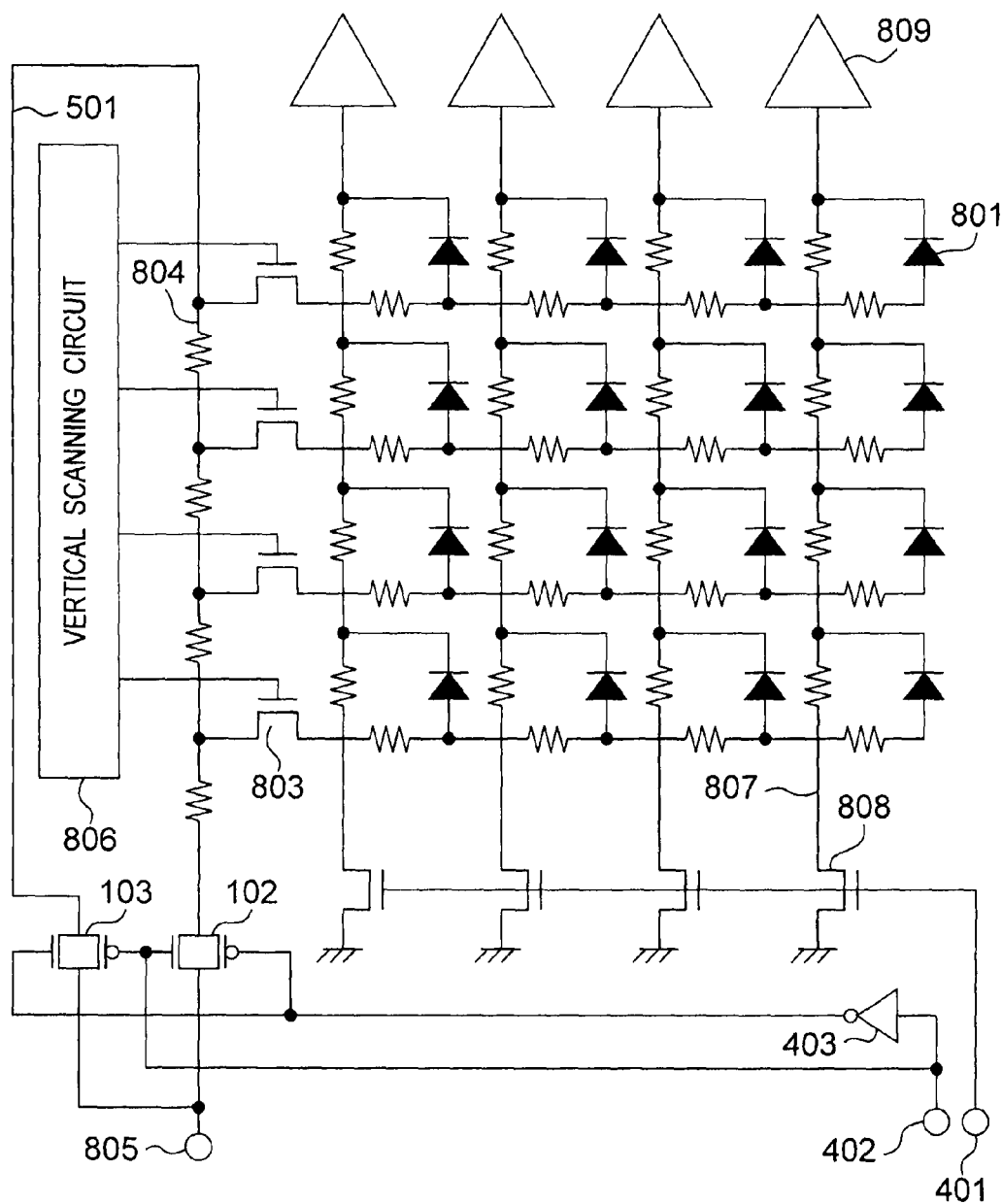
FIG. 6 is a circuit diagram showing a thermal infrared solid-state imaging device in preferred embodiment 2 of the invention.

FIG. 6 shows a thermal infrared solid-state imaging device of 4×4 pixels in Embodiment 2 of the invention. In FIG. 6, for the sake of simplicity of explanation, only essential elements are shown, omitting the detailed configuration of horizontal scanning circuit 810, reference signal output circuit 813, low-pass filters 816 and 818, buffer 817, and bias line 819. The integrating circuit 809 has one input.

In the configuration of the infrared solid-state imaging device shown in FIG. 6, the difference from the configuration in preferred embodiment 1 (see FIG. 1) lies in that only one power supply terminal 805 is provided, instead of the two power supply terminals 101 and 805 provided at both ends of the vertical power supply line 804. Accordingly, from the upper end of the vertical power supply line 804 to the switch 103, an outer peripheral power supply line 501 is provided at the outer side of the vertical scanning circuit 806. The outer peripheral power supply line 501 is set at a sufficiently low resistance as compared with the vertical power supply line 804. As a result, the number of required terminals may be saved by one as compared with the configuration in FIG. 1.

Embodiment 3

Figure 7:
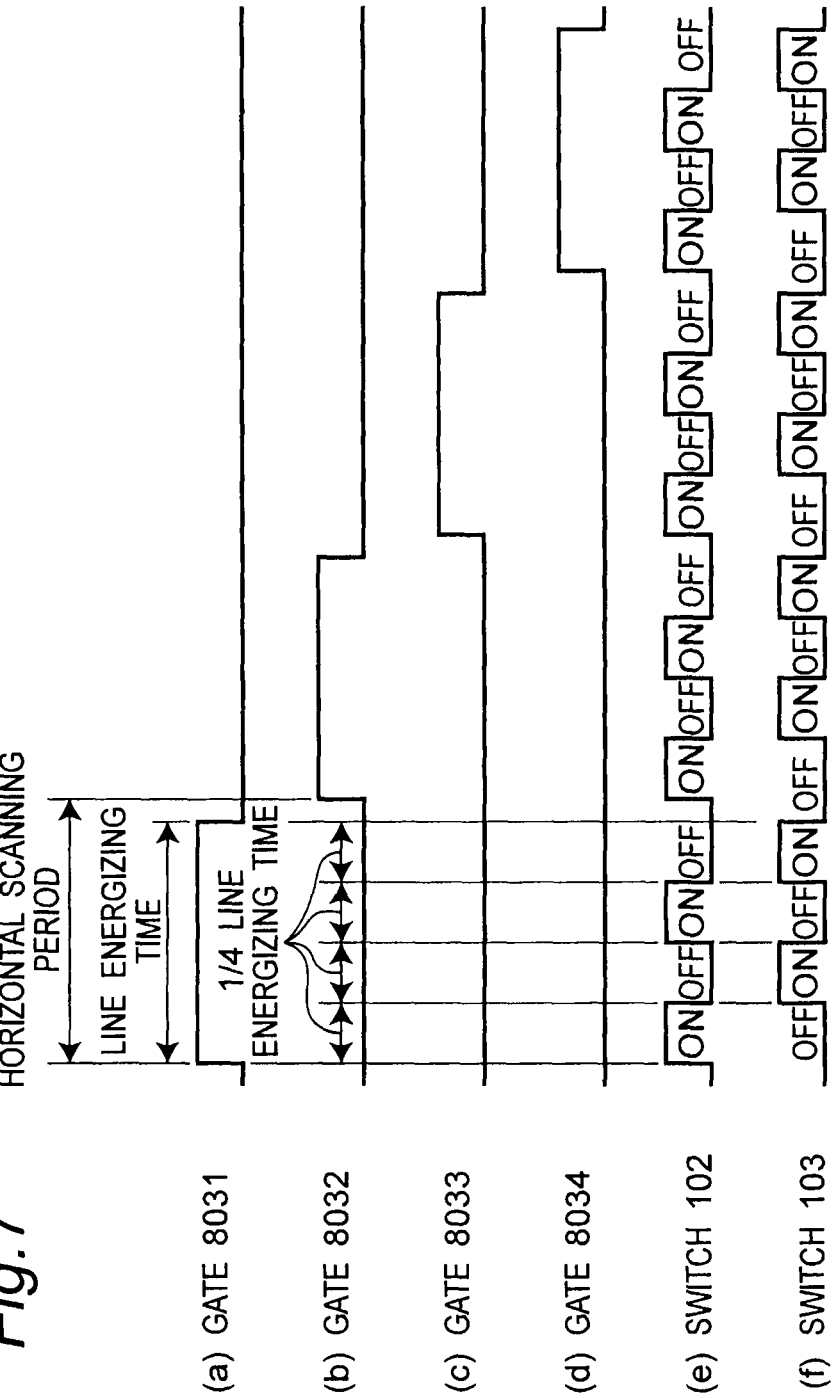
FIG. 7 is a timing chart showing the operation of a thermal infrared solid-state imaging device in preferred embodiment 3 of the invention.

In the foregoing embodiments, as shown in FIGS. 3 (e) and (f), the row energizing time (the integration time) is divided into a first half and a second half and the energizing paths are changed over, but the two divided integration times may be same in time length. That is, the row energizing time (the integration time) is equally divided into 2N sections (N being a natural number), and the energizing paths may be changed over alternately. For example, the integration time may be equally divided into four sections, and the energizing paths are changed over alternately. The opening and closing timing of the switches 102 and 103 in such a case is shown in FIGS. 7 (e) and (f). In the configuration of this preferred embodiment, the same effects as in preferred embodiment 1 are obtained.

Moreover, the foregoing embodiments describe the thermal infrared solid-state imaging device that utilizes the temperature characteristic of the voltage-current characteristic of diodes. However, as far as a solid-state imaging device includes a diode which is used as switching function element and a pixel array which includes vertical signal lines and horizontal drive lines in which a current flows, the concept of the preferred embodiments may be applied to the solid-state imaging device similarly. For example, the invention may be also applied in a thermal infrared solid-state imaging device including a bolometer connected to a diode in series and making use of the temperature characteristic of the voltage-current characteristic of the bolometer.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2009-064470, filed on Mar. 17, 2009, which is expressly incorporated herein by reference in its entirety.

What is claimed is:

1. A thermal infrared solid-state imaging device comprising:
    a pixel array having pixels containing at least one or more series-connected diodes disposed two-dimensionally in the horizontal direction and the vertical direction;
    a plurality of horizontal drive lines for connecting one end of each of the diodes commonly in each row;
    a plurality of vertical signal lines for connecting other end of each of the diodes commonly in each column;
    a vertical power supply line for supplying power to each horizontal drive line by way of a first switch, and commonly connecting the plurality of horizontal drive lines;
    a vertical scanning circuit for driving the switch;
    integrating circuits for integrating voltages at the ends of the vertical signal lines for a predetermined integration time; and
    current sources connected to the vertical signal lines at an opposite end to the end of the vertical signal line which is connected to the integrating circuit,
    wherein the integration time is equally divided substantially into two periods, and during one divided period of the integration time, energization is performed between one end of the vertical power supply line and the current source, and during the other divided period of the integration time, the energization is performed between other end of the vertical power supply line and the current source.

2. The thermal infrared solid-state imaging device according to claim 1, further comprising first and second power supply terminals connected to the both ends of the vertical power supply line by way of second and third switches, wherein the energization in the integration time is changed over by changing over the second and third switches.

3. The thermal infrared solid-state imaging device according to claim 1, further comprising a power supply terminal connected to one end of the vertical power supply line by way of a second switch, wherein the other end of the vertical power supply line is connected to the power supply terminal by way of a second power supply line of which resistance is lower than that of the vertical power supply line, and a third switch.

* * * * *